United States Patent [19]

Ikeda et al.

[11] Patent Number: 5,622,573
[45] Date of Patent: Apr. 22, 1997

[54] METHOD OF DETERMINING COMPONENTS OF A WELDING MATERIAL HAVING BEEN OVERLAID ONTO A CAST IRON BASE METAL

[75] Inventors: Hideaki Ikeda; Tuyoshi Kokusho, both of Sayama, Japan

[73] Assignee: Honda Giken Kogyo Kabushiki Kaisha, Tokyo, Japan

[21] Appl. No.: 411,978

[22] Filed: Mar. 28, 1995

[30] Foreign Application Priority Data

Nov. 11, 1994 [JP] Japan .................................. 6-278093
Nov. 14, 1994 [JP] Japan .................................. 6-279436

[51] Int. Cl.$^6$ .................. C21D 1/18; C23C 6/00
[52] U.S. Cl. ................ 148/517; 148/578; 228/160; 228/231
[58] Field of Search .................... 148/517, 578; 228/160, 231

[56] References Cited

U.S. PATENT DOCUMENTS 4,902,473  2/1990  Arata et al. .
5,361,968  11/1994  Tanaka et al. ................ 228/160

FOREIGN PATENT DOCUMENTS

0395477A1  10/1990  European Pat. Off. .
2109276    6/1983   United Kingdom .
2262745    6/1993   United Kingdom .
2272909    6/1994   United Kingdom .

OTHER PUBLICATIONS

Great Britain Search Report; Application No. GB 9507418.3; Dated Jul. 31, 1995.

*Primary Examiner*—Deborah Yee
*Attorney, Agent, or Firm*—Armstrong, Westerman, Hattori, McLeland & Naughton

[57] ABSTRACT

A welding material for hard-facing which is to be hardened by a supercooling treatment after overlaying onto a cast iron base metal has a basic component composition which meets, in an overlaid condition, both a first condition and a second condition. The first condition is that a nickel (Ni) equivalent and a chromium (Cr) equivalent fall within that region to be defined in Schaeffler's structure diagram in which a difference in hardness before and after the supercooling treatment is a predetermined value or above. The second condition is that a starting temperature of martensitic transformation is a predetermined temperature or below. The components of the welding material are determined by defining in Schaeffler's structure diagram a region in which a difference in hardness before and after the supercooling treatment becomes a predetermined value or above, obtaining a target composition in which the Ni equivalent and the Cr equivalent fall within the region and in which the starting temperature of martensitic transformation is a predetermined temperature or below, and determining the composition of basic components such that the target composition is attained in an overlaid condition.

1 Claim, 2 Drawing Sheets

METHOD OF DETERMINING COMPONENTS OF A WELDING MATERIAL HAVING BEEN OVERLAID ONTO A CAST IRON BASE METAL

BACKGROUND OF THE INVENTION

1. Field of the Invention

The present invention relates to a welding material for use in hard-facing that portion of a cast iron base metal of a metallic press die (punch and/or matrix) or the like which needs to be increased in hardness, as well as to a method of determining the components of the welding material.

2. Description of Related Art

As a method of manufacturing a metallic trimming press die which is used in cutting a blank of a predetermined length from a metallic thin roll material of aluminum plate, steel plate or the like, or manufacturing a metallic trimming press die which is used in cutting unnecessary peripheral portion after having formed the blank by drawing in a metallic drawing die, there has hitherto been known a method of overlaying or cladding a welding material, which serves as a cutter material, onto that raw material for the metallic die which has been cast into a predetermined shape, and then cutting a cutter out of the overlaid or clad portion.

This kind of welding material for overlaying should preferably have a lower hardness after overlaying because the cutter must be cut into a predetermined shape by machining work. Once the cutter has been cut by machining work, however, it should preferably attain a high hardness relatively easily. There is known in Japanese Published Unexamined Patent Application No. 15481/1994 (corresponding to U.S. Pat. No. 5,361,968) a welding material in which a starting temperature of martensitic transformation (hereinafter called Ms temperature) of the welding material is set at 150° C. or below, and the overlaid portion after overlaying has a hardness of HRC (Rockwell C Hardness) 45 or below and the hardness becomes HRC 45 or above by subjecting it, after welding, to a supercooling treatment at a temperature of 0° C. or below.

The component composition (i.e., the composition of components) of the above-described conventional welding material is determined by using only the Ms temperature as a parameter. If the Ms temperature is lowered, a large amount of austenite is retained at room temperature and machining consequently becomes easy. It is, however, not clear by the Ms temperature alone whether the overlaid portion hardens up to a predetermined hardness after the supercooling treatment. Therefore, a large number of samples are conventionally prepared to determine the composition by actually carrying out the overlaying and the supercooling treatment, resulting in much time and expenses in determining the composition.

As a result of diligent studies and efforts, the inventors of the present invention have found out that there is a close relationship between each region in Schaeffler's structure diagram and the difference in hardness before and after the supercooling treatment. In other words, Schaeffler's structure diagram is a diagram which has a nickel (Ni) equivalent and a chromium (Cr) equivalent as parameters. It has thus been found out that a line of equal difference in hardness on which the difference in hardness before and after the supercooling treatment becomes equal (hereinafter called an "isohardness" line) can be drawn in the structure diagram.

Based on the above findings, the present invention has an object of providing a welding material which is easy in machining after welding and which can attain a sufficient hardness after the supercooling treatment, as well as a method of determining the components of the welding material.

SUMMARY OF THE INVENTION

In order to attain the above and other objects, the present invention is a welding material having a basic component composition which meets, in an overlaid condition, both a first condition and a second condition, the first condition being that a nickel (Ni) equivalent and a chromium (Cr) equivalent fall within that region to be defined in Schaeffler's structure diagram in which a difference in hardness before and after a supercooling treatment is a predetermined value or above, the second condition being that a starting temperature of martensitic transformation is a predetermined temperature or below.

A method of determining components of a welding material for hard-facing according to the present invention comprises: defining in Schaeffler's structure diagram a region in which a difference in hardness before and after the supercooling treatment becomes a predetermined value or above; obtaining a target composition in which a nickel (Ni) equivalent and a chromium (Cr) equivalent fall within the region and in which a starting temperature of martensitic transformation is a predetermined temperature or below; and determining the basic component composition such that the target composition is attained in an overlaid condition.

In Schaeffler's structure diagram shown in FIG. 1A, LA represents a border line between an austenitic region in which only austenite is present at room temperature and a region in which both austenite and martensite are present in mixture. Even within the austenitic region, if the Ni equivalent given in the ordinate is increased, a carbide will precipitate into the structure. The limit within which the carbide does not precipitate is the Ni equivalent of 34 and its border line is shown by LC. It follows that the composition of the welding material must fall within the region enclosed by LA and LC. Then, the region X inclusive of the crossing point of LA and LC is shown in FIG. 1B in an enlarged condition. In the Figure, the value given on one side of each square mark represents the difference in hardness in HRC before and after the supercooling treatment. It can be seen that the value of the difference in hardness increases towards the crossing point of LA and LC. LH's represent isohardness lines formed by connecting the points at which the difference in hardness is the same. Accordingly, if the component composition (i.e., the composition of components) to meet the below-mentioned conditions is made to be the basic component composition of the welding material, the material becomes easy in machining after welding and can be hardened to a sufficient hardness after the supercooling treatment. The conditions to be met are namely: that the ranges of the Ni equivalent and the Cr equivalent are set such that they fall within an approximately inverted triangle enclosed by a desired difference in hardness LH, LA and LC; that the component composition is such as to meet the second condition that the Ms temperature is a predetermined temperature or below; and that the component composition is such as to meet the first condition that the Ni equivalent and the Cr equivalent respectively fall within the set ranges.

By the way, the welding material of the above-described basic component composition contains 0.50–1.50% by weight of carbon and, if it is subjected to plastic working into the shape of a wire, it is likely to be broken due to work hardening. Therefore, there is no other choice than forming the welding material of the above-described basic component composition into the shape of a bar. However, it is necessary to form it into the shape of a wire in order to automate the overlaying step by using a robot or the like.

Further, in case the base metal to be overlaid by welding is a cast iron, there is a disadvantage in that the carbon liquates out of the cast iron base metal into the overlaid or clad portion, with the result that the carbon content in the overlaid portion increases by 0.4–0.9% by weight. This increase brings about a harmful effect in that the hardness becomes high and consequently that the machining work becomes difficult. In order to prevent this kind of harmful effect, it is necessary to weld the welding material in a multiple layers so that the carbon from the side of the base metal does not enter or get mixed into the outer layer in the overlaid portion. However, this kind of welding in multiple layers takes a large number of man-hours in overlaying work.

In such a case, if an arrangement is made such that the carbon content in the welding material is reduced by 0.4–0.9% by weight from that carbon content in the composition which meets the above first condition and the second condition, the composition of the overlaid portion will become the one that meet both the conditions because the carbon content in the overlaid portion increases due to the liquated carbon from the cast iron base metal. Therefore, the welding material can be overlaid not in multiple layers but in a single layer, resulting in a simpler overlaying work. Further, by decreasing the carbon content in the welding material in the manner as described above, it will not be subject to work hardening during the plastic working into the shape of a wire and thus will not break. Therefore, an automated overlaying work can be effected by using the welding material that is formed into the shape of a wire.

BRIEF DESCRIPTION OF THE DRAWINGS

The above and other objects and the attendant advantages of the present invention will become readily apparent by reference to the following detailed description when considered in conjunction with the accompanying drawings wherein.

DETAILED DESCRIPTION OF A PREFERRED EMBODIMENT

The Ms temperature was calculated by the following formula and the ratio of each of basic components other than iron (Fe) was obtained such that the Ms temperature becomes 50°–60° C. One example of the basic component composition (i.e., the composition of the basic components) is given below.

Ms (° C.)=538−317×carbon (C)−33×manganese (Mn)−17×nickel (Ni)−28×chromium (Cr)−11×molybdenum (Mo)−11×silicon (Si)−11×tungsten (W)

| Basic Component Composition (% by weight) | | | | | | |
| --- | --- | --- | --- | --- | --- | --- |
| C | Mn | Ni | Cr | Mo | Si | W |
| 1.1 | 1.0 | 0.5 | 3.0 | 0 | 1.0 | 0 |

A sample was prepared by adding, to the above basic component composition, 0.2% of cobalt (Co) and 0.01% of boron (B), and overlaying by welding was actually made onto the base metal. The hardness after overlaying and the hardness after the supercooling treatment were measured. A Ni equivalent and a Cr equivalent were obtained by the following formulas.

Ni equivalent=30×C+0.5×Mn+Ni

Cr equivalent=Cr+Mo+1.5×Si

The Ms temperature of the above sample reached 52.8° C. and the Ni equivalent became 34 and the Cr equivalent became 4.5. This corresponds to point P in FIG. 1B and lies within a region enclosed by an isohardness line LH20, which means a difference in hardness in HRC of 20, and lines LC and LA. It has been confirmed that the hardness after overlaying was HRC 34 and that the hardness increased up to HRC57 when the sample was subjected to the supercooling treatment, resulting in a difference in hardness of 23 (in HRC) before and after the supercooling treatment.

Further, for the purpose of comparison, a comparative sample with the following basic component composition was prepared.

| Basic Component Composition (% by weight) | | | | | | |
| --- | --- | --- | --- | --- | --- | --- |
| C | Mn | Ni | Cr | Mo | Si | W |
| 1.0 | 0.5 | 0 | 3.0 | 0 | 0.7 | 0 |

In this comparative sample, 0.7% by weight of Co was added. The MS temperature, the Ni equivalent and the Cr equivalent of this comparative sample were respectively as follows.

Ms temperature=112.8

Ni equivalent=30.25

Cr equivalent=4.05

Figure 1A:
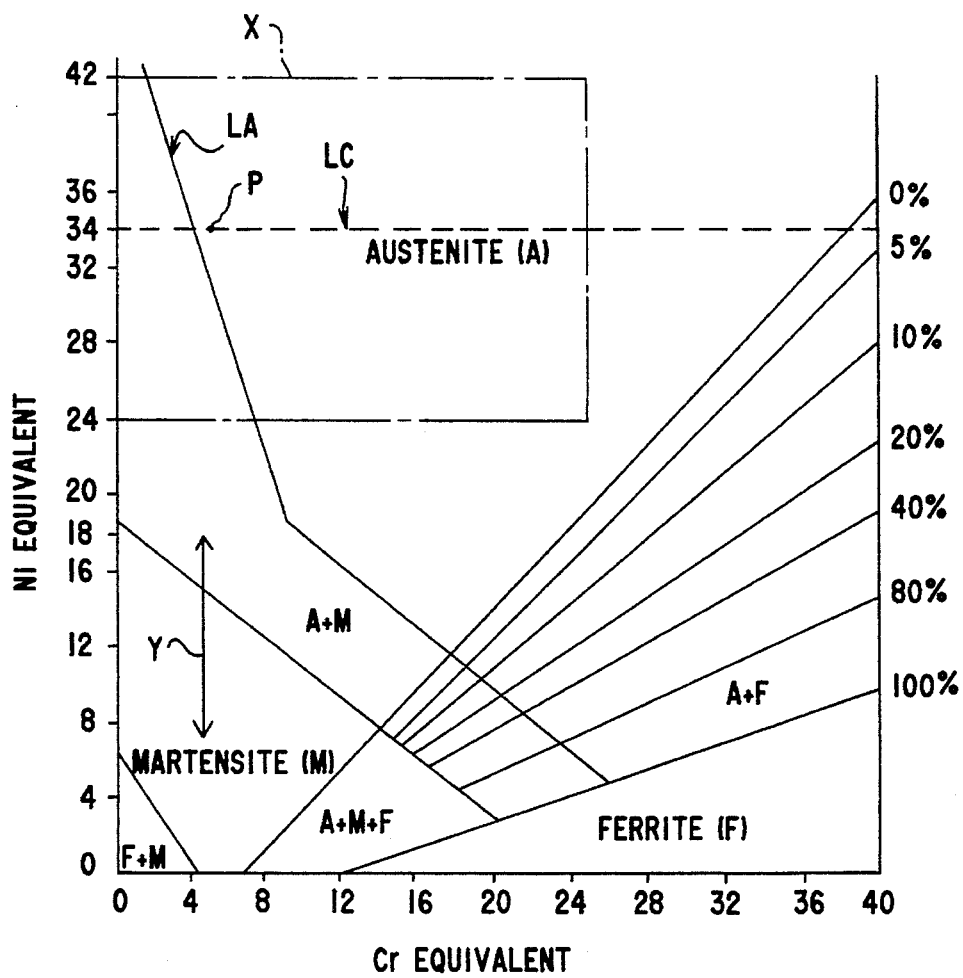
FIG. 1A is a Schaeffler's structure diagram.
Figure 1B:
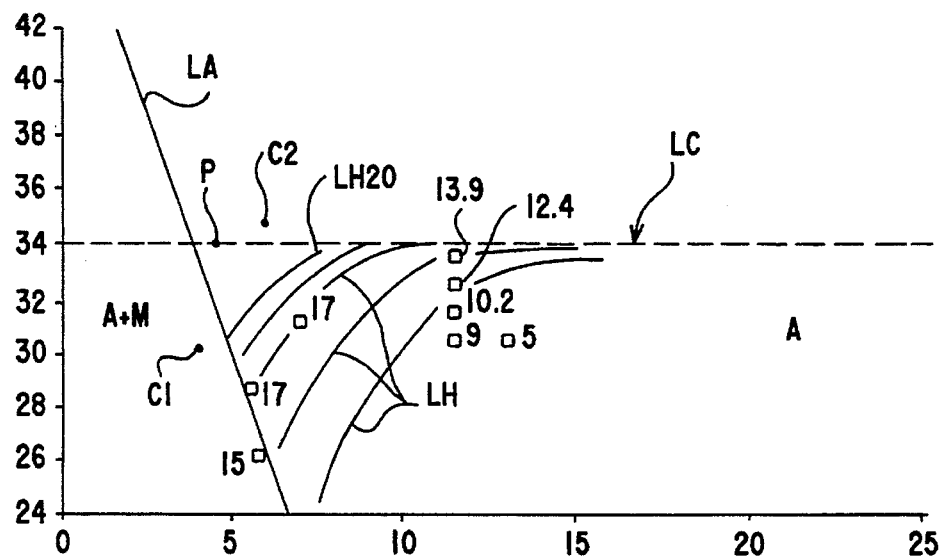
FIG. 1B is a an enlarged diagram of a region X thereof.

This corresponds to point C1 in FIG. 1B. The hardness after overlaying was HRC41 and the hardness increased only up to HRC54 even after it was subjected to the supercooling treatment, resulting in a difference in hardness before and after the supercooling treatment of only 13 (in HRC). This seems to be due to a phenomenon in that, after overlaying, there already occurred martensite, which then must have resulted in a relatively smaller drop in hardness after overlaying with a consequent hardness difference that was not very large.

For the purpose of further comparison, a still another comparative sample with the following basic component composition was prepared.

| Basic Component Composition (% by weight) | | | | | | |
| --- | --- | --- | --- | --- | --- | --- |
| C | Mn | Ni | Cr | Mo | Si | W |
| 1.1 | 1.5 | 1.0 | 4.5 | 0 | 1.0 | 0 |

In this comparative sample, 1.0% by weight of Co was added. The MS temperature, the Ni equivalent and the Cr equivalent of this comparative sample were respectively as follows.

Ms temperature=−14.2

Ni equivalent=34.75

Cr equivalent=6.0

This corresponds to point C2 in FIG. 1B. The hardness after overlaying was HRC27 and the hardness increased only up to HRC40 even after it was subjected to the supercooling treatment, resulting in a difference in hardness before and after the supercooling treatment of only 13 (in HRC). This seems to be due to a phenomenon in that, because the point in question exceeded LC in the Figure, a carbide precipitated after overlaying, thereby failing to attain a predetermined hardness.

Figure 2:
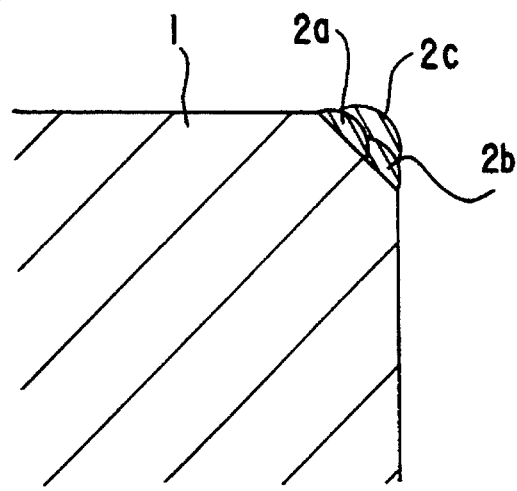
FIG. 2 is a sectional view of a portion overlaid in multiple layers.

By the way, if a welding material is overlaid onto a cast iron base metal, carbon that will liquate from the base metal gets mixed into the overlaid portion. This results in a higher hardness of the overlaid portion with a consequent difficulty in machining work thereof. In such a case, as shown in FIG. 2, the welding material may be overlaid or clad in multiple layers (e.g., in 2 or 3 beads) on the base metal 1. Then, although the carbon to be liquated from the base metal 1 may get mixed into beads 2a, 2b in the inner layer portion, the same component composition as that of the welding material can be obtained in bead 2c in an outer layer portion that is overlaid with the same welding material. Therefore, there will be no problem.

Figure 3:
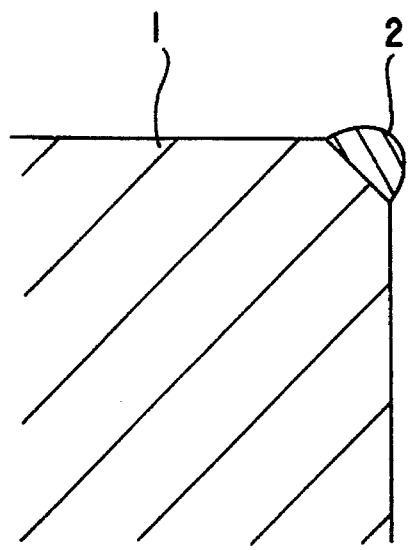
FIG. 3 is a sectional view of a portion overlaid in a single layer.

Further, as shown in FIG. 3, in case the overlaying is made with a single layer of bead 2 on the base metal 1, the amount of carbon content in the welding material is reduced in advance by the amount corresponding to that of carbon to be liquated from the base metal 1, i.e., 0.4–0.9% by weight so that the predetermined component composition can be attained, in an overlaid condition, inclusive of the liquated carbon.

By the way, point P in FIG. 1B lies in the region of austenite. However, when this kind of welding material is subjected to plastic working into the shape of a wire, work hardening occurs through the transformation of austenite into martensite due to a stress. As a result, the welding material becomes easy to break. In such a case, by reducing the carbon content by 0.4–0.9% by weight from the composition at point P, the Ni equivalent lowers by 12–22, with the result that the composition in Schaeffler's structure diagram corresponds to or lies in the Y region in FIG. 1A. In this region there retains little or no austenite. Therefore, even if the welding material may be subjected to plastic working into the shape of a wire, work hardening does not occur and the welding material will not break. If this welding material is overlaid with a single layer, in an overlaid condition, the composition becomes that of point P in FIG. 1B by the liquation of carbon from the base metal 1.

As can be seen from the foregoing explanations, according to the present invention, there can be obtained a welding material in which the hardness after overlaying is low with the consequent easy machining work such as cutting or the like and in which the hardness can thereafter be increased by a supercooling treatment. Also, the basic component composition can be determined without actually making test pieces and then measuring their hardnesses.

It is readily apparent that the above-described welding material for hard facing and the method of determining components of the welding material meet all of the objects mentioned above and also have the advantage of wide commercial utility. It should be understood that the specific form of the invention hereinabove described is intended to be representative only, as certain modifications within the scope of these teachings will be apparent to those skilled in the art.

Accordingly, reference should be made to the following claims in determining the full scope of the invention.

What is claimed is:

1. A method of determining components of a welding material having been overlaid onto a cast iron base metal, said method comprising the steps of:

defining in Schaeffler's structure diagram a region at a value in which there is a difference in hardness before and after a supercooling treatment, said Schaeffler's structure diagram being a diagram having a nickel (Ni) equivalent and a chromium (Cr) equivalent as parameters;

obtaining a target composition in which said nickel (Ni) equivalent and said chromium (Cr) equivalent fall within the region and within a starting temperature of martensitic transformation, the region being enclosed within LA and LC borderlines in said Schaeffler's structure diagram, LA being a borderline between an austenitic region in which only austenite is present at room temperature and a region in which both austenite and martensite are present in mixture, and LC being a borderline in which carbide does not precipitate; and determining the composition of basic components such that the target composition is attained in an overlaid condition.

\* \* \* \* \*